May 16, 1944.    E. H. LAND    2,348,912
SELF-ANALYZING DICHROIC IMAGE
Filed Sept. 19, 1940

INVENTOR
Edwin H. Land
BY
Donald L. Brown
ATTORNEY

Patented May 16, 1944

2,348,912

UNITED STATES PATENT OFFICE 2,348,912

SELF-ANALYZING DICHROIC IMAGE

Edwin H. Land, Cambridge, Mass., assignor to Polaroid Corporation, Dover, Del., a corporation of Delaware Application September 19, 1940, Serial No. 357,441

4 Claims. (Cl. 88—65)

This invention relates to prints or other designs produced in light-polarizing areas.

It is a particular object of the present invention to provide a two-dimensional print or other design produced in light-polarizing areas which may be viewed without the use of separate analyzing means.

Another object is to provide such an article wherein the print or other design in light-polarizing areas functions as its own analyzer.

A further object is to provide such a self-analyzing print in the form of a single, two-dimensional, dichroic print provided with a non-depolarizing, reflecting backing and to provide, between the print and said backing, a sheet of birefringent material which is adapted to rotate the vibration direction of polarized light through a predetermined angle.

Other objects and advantages will in part appear and in part be pointed out in the course of the following description of one embodiment of the invention, which is given, as a non-limiting example, in connection with the accompanying drawing, in which.

Figure 1:
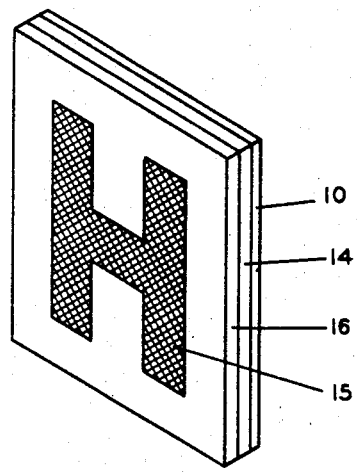
Figure 1 is a somewhat diagrammatic view in perspective showing an article embodying one form of the present invention.

The embodiment of the invention shown in the drawing comprises a backing plate 10, having a light-reflecting surface 12, a sheet 14 of birefringent material, and a sheet 16 of transparent material and having a predetermined area 15 thereof adapted to polarize transmitted light.

Figure 2:
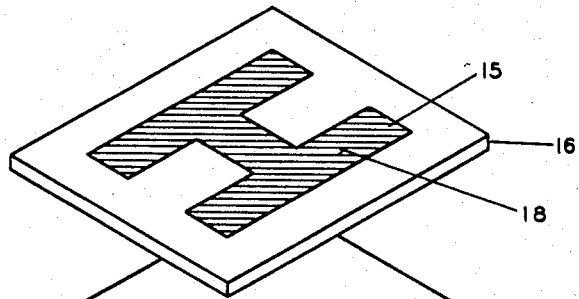
Fig. 2 is a diagrammatic, exploded view in perspective showing the separate component parts of the article shown in Fig. 1.
Figure 3:
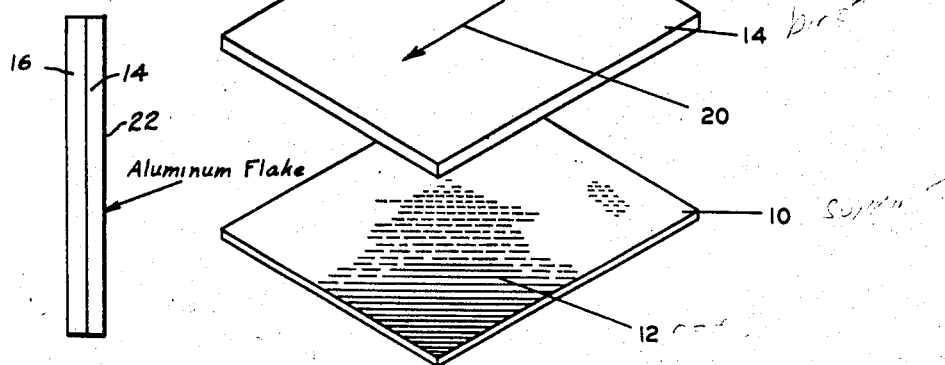
Fig. 3 is a view showing aluminum flake as a reflecting layer.

Backing plate 10 may be made of any material providing a satisfactory reflecting surface 12 which will reflect incident polarized light without appreciable depolarization or other alteration of its polarization characteristics. For example, element 10 may comprise metal foil, paper coated with a suitable metallic reflecting layer as shown in Figures 1 and 2, or a suspension of material such as aluminum flake 22 in a plastic as shown in Figure 3. If sheets 14 and 16 are of sufficiently heavy material, reflecting surface 12 may comprise simply a deposit of, for example, aluminum flake on the exposed surface of sheet 14. It is to be understood that any suitable means for providing a non-depolarizing, reflecting surface are to be considered as coming within the scope of this invention.

Sheet 16 may be formed of a variety of materials, and the design or image may be reproduced thereon in a variety of ways. For example, sheet 16 may comprise a transparent, hydrophilic, linear polymeric plastic such as polyvinyl alcohol at least the surface molecules of which should be substantially oriented, for example, in the direction indicated by parallel lines 18. Any desired dichroic image, picture, design, or the like, 15, may then be formed in this material by printing thereon with a water-soluble, direct cotton dye of the azo type, or by staining the sheet with iodine in the presence of an iodide. The stain or dye may be applied to the sheet from a half-tone plate, a gelatin relief, or the like, and the color of the dichroic image produced in the sheet may be controlled by selecting suitable dyes, stains, or the like, or combinations thereof.

Alternatively, sheet 16 may initially be formed of a light-polarizing material, such as an optically oriented suspension of minute crystals of herapathite or other polarizing material in a suitable medium, such as cellulose acetate. Any desired predetermined picture, indicia or design 15 may then be reproduced on the sheet by destroying or otherwise altering the polarizing characteristics of the sheet over predetermined areas of the surface. For example, either the areas forming design 15 or the surrounding areas may be protected as by a coating such as of wax or of a hardened gelatin resist, and the sheet then subjected to treatment which destroys or otherwise alters the polarizing characteristics of the exposed areas.

In the drawing, the areas forming the design 15 are indicated as light-polarizing and the surrounding areas of sheet 16 are represented as non-polarizing. For the purpose of illustration, it may be assumed that the transmission axis of area 15 will be parallel to lines 18.

In accordance with the practice of the invention, area 15 in sheet 16 may comprise any design, indicia, picture or print, whether photographically produced or otherwise.

In the preferred embodiment of the invention, sheet 14 comprises birefringent material of such thickness as to impart a quarter-wave retardation to polarized light transmitted therethrough, and arrow 20 indicates one of the optical axes thereof. For example, sheet 14 may conveniently comprise a set sheet of oriented cellulose or cellulosic material such, for example, as quarter-wave Cellophane. Sheets 14 and 16 should be so positioned with respect to each other that the optical axes of sheet 14 make angles of substantially 45° with the transmission axis of area 15, as is indicated by the respective directions of arrow 20 and lines 18, and it will be seen that they will similarly make angles of substantially 45° with the direction of orientation of the molecules of sheet 16.

Elements 10, 14 and 16 are preferably secured together to form a unit print by any suitable means, as by an adhesive.

It is believed that the operation of the above-described article will now be clear. Light passing through polarizing area 15 of sheet 16 will be polarized to vibrate in a predetermined direction. Sheets 14 and 16 are initially so positioned with respect to each other that this vibration direction will be at an angle of substantially 45° to the optical axes of sheet 14. Since sheet 14 is chosen as a quarter-wave plate, positioned with its optical axes as described, the polarized beam transmitted thereby, after reflection from surface 12 and retransmission through sheet 14, will have had its vibration direction rotated through 90° and it will be absorbed by the dichroic material of area 15, making clearly apparent the image formed by said area, as is indicated by the criss-cross lines on area 15 in Fig. 1. Accordingly the design formed by area 15 will be readily seen without the use of any separate analyzer.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In combination, a sheet of transparent material comprising dichroic material forming light-polarizing areas positioned to form a predetermined design, means providing substantially a quarter-wave retardation plate bonded to said sheet and positioned with its optical axes at angles of substantially 45° to the transmission axes of said polarizing areas, and means providing a non-depolarizing, reflecting surface bonded to said quarter-wave plate.

2. An article of manufacture comprising, in combination, a sheet of transparent, plastic material, predetermined areas thereof providing a dichroic image, means providing substantially a quarter-wave retardation plate bonded to said sheet and positioned with its optical axes at angles of substantially 45° to the transmission axis of said image, and means providing a non-depolarizing, reflecting surface bonded to said quarter-wave plate.

3. An article of manufacture comprising, in combination, a sheet of plastic material of the class consisting of the hydrophilic, linear polymers, at least the surface molecules of said sheet being substantially oriented, predetermined areas of said oriented surface being dichroic, said dichroic areas being positioned to form a predetermined design, means providing substantially a quarter-wave retardation plate bonded to said sheet and positioned with its optical axes at angles of substantially 45° to the direction of orientation of the molecules of said sheet, and means providing a non-depolarizing, reflecting surface bonded to said quarter-wave plate.

4. In combination, a sheet of transparent material comprising dichroic material forming light-polarizing areas positioned to form a predetermined design, means providing substantially a quarter-wave retardation plate bonded to said sheet and positioned with its optical axes at angles of substantially 45° to the transmission axes of said polarizing areas, and a layer of aluminum flake deposited on the outer surface of said quarter-wave plate.

EDWIN H. LAND.